(12) United States Patent
Negi et al.

(10) Patent No.: US 10,458,728 B2
(45) Date of Patent: Oct. 29, 2019

(54) TURBULENCE MEMBER AND HEAT EXCHANGER USING SAME, AND WATER HEATER

(71) Applicant: Rinnai Corporation, Nagoya-shi, Aichi (JP)

(72) Inventors: Hidenao Negi, Nagoya (JP);
Toshimitsu Nagasaka, Nagoya (JP);
Takaaki Nakagoshi, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 18 days.

(21) Appl. No.: 15/599,625

(22) Filed: May 19, 2017

(65) Prior Publication Data

US 2017/0343304 A1 Nov. 30, 2017

(30) Foreign Application Priority Data

May 24, 2016 (JP) .................................. 2016-103215

(51) Int. Cl.
| | |
|---|---|
| *F28F 13/12* | (2006.01) |
| *B01F 5/06* | (2006.01) |
| *F24H 9/00* | (2006.01) |
| *F28D 21/00* | (2006.01) |
| *F24H 8/00* | (2006.01) |

(52) U.S. Cl.
CPC ............ *F28F 13/12* (2013.01); *B01F 5/0614* (2013.01); *B01F 5/0617* (2013.01); *F24H 9/0026* (2013.01); *F28D 21/0007* (2013.01); *B01F 2005/0639* (2013.01); *F24H 8/006* (2013.01); *Y02B 30/106* (2013.01)

(58) Field of Classification Search
CPC ...... F28F 13/12; B01F 5/0614; F24H 9/0026; F28D 21/0007
USPC ...................................... 165/109.1
See application file for complete search history.

(56) References Cited

U.S. PATENT DOCUMENTS

| | | | | | |
|---|---|---|---|---|---|
| 662,964 | A | * | 12/1900 | Reis ................. | F28F 13/12 122/44.2 |
| 2,359,288 | A | * | 10/1944 | Brinen .............. | F28F 13/12 138/38 |

(Continued)

FOREIGN PATENT DOCUMENTS

| | | |
|---|---|---|
| JP | 62-013958 | 1/1987 |
| JP | 11-108458 | 4/1999 |

*Primary Examiner* — Raheena R Malik
(74) *Attorney, Agent, or Firm* — Amin, Turocy & Watson LLP

(57) ABSTRACT

A turbulence member is made of a flat plate member configured to be inserted into a heat-transfer tube having a substantially elliptical cross-sectional shape. The flat plate member is a generate turbulence in a fluid flowing inside the heat-transfer tube by a plurality of projected pieces projected on both front and back surfaces. A rotation preventing piece configured to prevent rotation of the flat plate member inside the heat-transfer tube is provided in at least one of both side edges along the flow passage direction in the flat plate member. The rotation preventing piece is provided at a predetermined angle to the flat plate member so that a forefront comes into contact with a tube wall inner circumferential surface of the heat-transfer tube. A space through which the fluid can circulate is formed between the rotation preventing piece and the tube wall inner circumferential surface.

10 Claims, 9 Drawing Sheets

(56) References Cited

U.S. PATENT DOCUMENTS

| | | | | |
|---|---|---|---|---|
| 2,677,394 A * | 5/1954 | Brinen | F01P 11/08 138/38 |
| 2,688,986 A * | 9/1954 | O'Brien | F01P 11/08 138/38 |
| 2,691,991 A * | 10/1954 | Schutt | F01M 5/00 138/38 |
| 2,852,042 A * | 9/1958 | Lynn | F28F 13/12 138/38 |
| 3,783,938 A * | 1/1974 | Chartet | B60H 1/00321 165/166 |
| 3,837,396 A * | 9/1974 | Newton | F25B 39/04 138/38 |
| 4,106,558 A * | 8/1978 | Neveux | F28F 13/12 165/109.1 |
| 4,265,275 A * | 5/1981 | Heller | F28F 1/40 138/38 |
| 4,352,378 A * | 10/1982 | Bergmann | F28F 13/12 138/38 |
| 4,534,409 A * | 8/1985 | Cadars | F28F 13/12 138/38 |
| 4,577,681 A * | 3/1986 | Hughes | F23M 9/00 138/38 |
| 4,642,149 A * | 2/1987 | Harper | F28F 9/22 165/159 |
| 4,727,907 A * | 3/1988 | Duncan | F28F 13/12 138/38 |
| 4,899,812 A * | 2/1990 | Altoz | B01F 5/0616 138/38 |
| 5,094,224 A * | 3/1992 | Diesch | F28F 1/42 126/110 R |
| 5,983,994 A * | 11/1999 | Tsou | F28G 1/08 15/104.16 |
| 6,286,465 B1 * | 9/2001 | Hughes | F23M 9/003 122/155.2 |
| 7,117,686 B2 * | 10/2006 | Jung | F28F 13/12 62/238.4 |
| 9,242,214 B2 * | 1/2016 | Pappalardo | B01F 5/0617 |

* cited by examiner

PRIOR ART

TURBULENCE MEMBER AND HEAT EXCHANGER USING SAME, AND WATER HEATER

FIELD OF THE INVENTION

The present invention relates to a turbulence member configured to be inserted into a heat-transfer tube for generating turbulence in a fluid flowing inside the heat-transfer tube and a heat exchanger using the same, and a water heater.

BACKGROUND ART

A heat-transfer tube configuring a heat exchanger is heated by combustion exhaust gas of a gas burner to thereby raise a temperature of an inside fluid. There has been known a technique of inserting, into the heat-transfer tube, the turbulence member configured to generate turbulence in the fluid inside the heat-transfer tube in order to suppress local boiling of the fluid inside the heat-transfer tube and to promote heat exchange, thereby increasing heat efficiency (For example, Japanese Unexamined Patent Publication No. H11-108458 A).

As the turbulence member, for example, as shown in FIG. 8, there is a turbulence member having a configuration in which by applying cut-and-raising-and-bending work to a flat plate member 3, cut-and-raised holes 30a, 30b, 30c, and cut-and-raised pieces 31a, 31b, 31c are formed, and the plurality of cut-and-raised pieces 31a, 31b, 31c are projected in both front and back surfaces of the flat plate member 3. In this turbulence member, the fluid flowing inside the heat-transfer tube hits the cut-and-raised pieces 31a, 31b, 31c, and thereby, as indicated by arrow, the turbulence of the fluid can be promoted, so that the local boiling can be efficiently suppressed.

Moreover, in the above-described turbulence member, in order that the turbulence member may not unexpectedly rotate in a state set at a predetermined position inside the heat-transfer tube 4 having an elliptical cross-sectional shape, as shown in FIG. 9, both side edges of the flat plate member 3 along a flow passage direction are bent and these bent portions 32 are brought into contact with a tube wall inner circumferential surface 40 of the heat-transfer tube 4 to thereby function as rotation preventing means of the turbulence member (For example, Japanese Unexamined Patent Publication No. S62-13958 A).

Each of the bent portions 32 formed in the flat plate member 3 cannot adhere to the tube wall inner circumferential surface 40 made of a curved surface of the heat-transfer tube 4 having a circular or elliptical cross-sectional shape, so that a slight gap 30 is caused between each of the bent portions 32 and the tube wall inner circumferential surface 40.

Since this gap 30 is very small, a flow passage resistance is large, so that the fluid hardly flows, and stagnation of the fluid is caused inside the gap 30. Further, since when a foreign substance such as dust and the like flows into the gap 30 and deposits there, the fluid further stagnates inside the gap 30, there is a possibility that gap corrosion is caused in the heat-transfer tube 4 from a portion of the gap 30.

SUMMARY OF THE INVENTION

The present invention provides a turbulence member configured to prevent stagnation of a fluid into a gap formed between the turbulence member and a tube wall inner circumferential surface of a heat-transfer tube to prevent gap corrosion.

The present invention provides a turbulence member made of a flat plate member configured to be inserted into a heat-transfer tube having a substantially elliptical cross-sectional shape in a flow passage direction, and to generate turbulence in a fluid flowing inside the heat-transfer tube by a plurality of projected pieces projected on both front and back surfaces of the flat plate member, wherein a rotation preventing piece configured to prevent rotation of the flat plate member inside the heat-transfer tube is provided in at least one of both side edges along the flow passage direction in the flat plate member, the rotation preventing piece is provided at a predetermined angle to the flat plate member so that a forefront comes into contact with a tube wall inner circumferential surface of the heat-transfer tube, and a space through which the fluid can circulate is formed between the rotation preventing piece and the tube wall inner circumferential surface.

According to the configuration, the flat plate member is inserted into the heat-transfer tube so that the forefront of the rotation preventing piece provided in at least one of the side edges of the flat plate member comes into contact with the tube wall inner circumferential surface of the heat-transfer tube. The flat plate member is set at a predetermined position inside the heat-transfer tube in a state where the rotation inside the heat-transfer tube is prevented by the rotation preventing piece, and this state is held. In the fluid flowing inside the heat-transfer tube, the turbulence is generated by the projected pieces projected on the front side and on the back side of the flat plate member, and the fluid enters the space formed between the rotation preventing piece and the tube wall inner circumferential surface. Since the space is set to have an enough size for the fluid to circulate therethrough, no flow passage resistance is caused inside the space, so that the fluid does not stagnate. Moreover, even if a foreign substance enters the space, it is pushed out by the fluid without stagnating in the space.

In the turbulence member, preferably, the rotation preventing piece is an erecting piece formed by bending the side edge of the flat plate member, and the erecting pieces are provided so that a front erecting piece bent on a front side and a back erecting piece bent on a back side are located alternately along a longitudinal direction of the side edge.

The flat plate member is set inside the heat-transfer tube so that respective forefronts of the front erecting piece and the back erecting piece of the flat plate member come into contact with the tube wall inner circumferential surface. This allows the flat plate member to be supported from both the front and back sides, which brings about a larger rotation suppression effect. Moreover, since alternately providing the front erecting piece and the back erecting piece can make shorter a distance where the space formed between each of the erecting pieces and the tube wall inner circumferential surface continues, the fluid can easily pass through the space, and the stagnation of the fluid inside the space can be further prevented.

In the turbulence member, preferably, the erecting piece has a first erecting piece erecting from the flat plate member in a substantially perpendicular direction, and a second erecting piece extending from a forefront of the first erecting piece in a direction toward the tube wall inner circumferential surface, and the erecting piece is set to have a length at which a forefront of the second erecting piece comes into contact with the tube wall inner circumferential surface.

This is an aspect in which the second erecting piece intervenes between the first erecting piece and the tube wall inner circumferential surface, and the space is configured by a range surrounded by the first erecting piece, the second erecting piece, and the tube wall inner circumferential surface, so that the space can function as a wider flow passage.

In the turbulence member, preferably, the erecting pieces are provided on both the side edges of the flat plate member along the flow passage direction, and boundary portions between the front erecting pieces and the back erecting pieces provided in the respective side edges are formed at positions deviated from one another in the longitudinal direction of the flat plate member in the one side edge and the other side edge.

Providing the erecting pieces on both the side edges of the flat plate member can increase contact points with the tube wall inner circumferential surface, thereby increasing the rotation suppression effect. Moreover, the boundary portions between the front erecting pieces and the back erecting pieces are provided not at positions opposed to one another in both the side edges of the flat plate member, but at the positions deviated in the longitudinal direction, which results in a configuration in which the boundary potions are not located on the same line with the flat plate member interposed. This enables the turbulence member to increase in strength with respect to a torsional direction of the flat plate member.

According to another mode of the present invention, a heat exchanger comprising the heat-transfer tube into which the turbulence member is inserted can be provided. The provision of the turbulence member brings about the heat exchanger having stable heat efficiency, and increased durability.

Moreover, according to still another mode of the present invention, a water heater comprising the heat exchanger can be provided. The provision of the heat exchanger brings about the water heater having stable heat efficiency, and increased durability.

As described above, according to the present invention, since the space between the rotation preventing piece and the tube wall inner circumferential surface of the heat-transfer tube can be set to have an enough size for the fluid to circulate, the fluid can be smoothly circulated inside the space without flow passage resistance.

Since even if a foreign substance such as dust and the like enters the space, it can be pushed out to a downstream side by the fluid, and thus, does not stagnate inside the space. Therefore, the stagnation of the fluid inside the space caused by clogging of the space with the foreign substance can be surely prevented, which can suppress inconvenience that the gap corrosion of the heat-transfer tube is caused in the space portion.

In the heat exchanger including the heat-transfer tube into which the turbulence member is inserted, and the water heater including the heat exchanger, the heat efficiency can be made stable, and the durability can be increased.

PREFERRED MODE FOR CARRYING OUT THE INVENTION

Detailed descriptions of preferred embodiments to carry out the present invention will be given with reference to the attached drawings.

Figure 1:
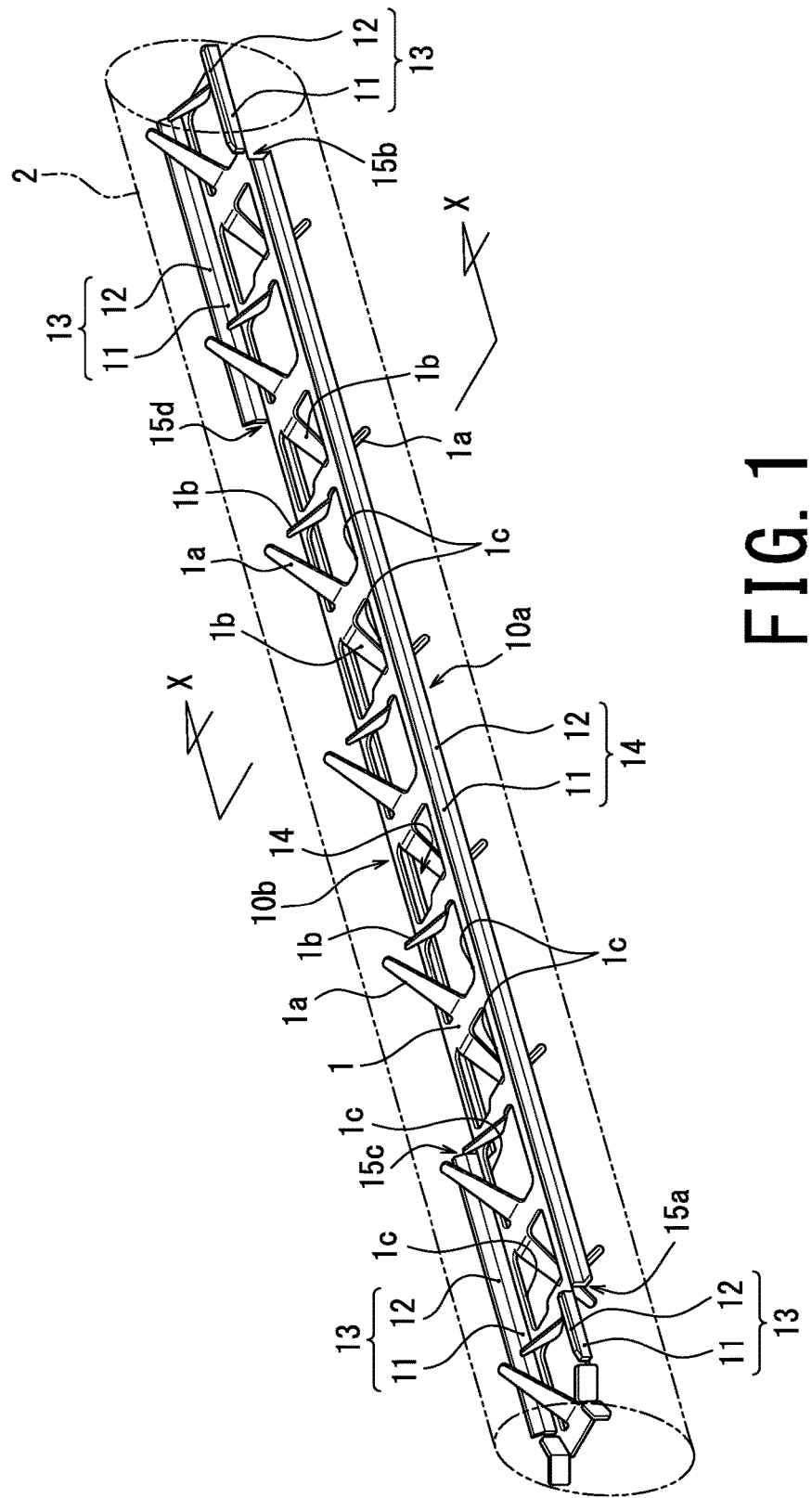
FIG. 1 is a perspective view showing a state where a turbulence member according to a first embodiment of the present invention is mounted inside a heat-transfer tube.
Figure 2:
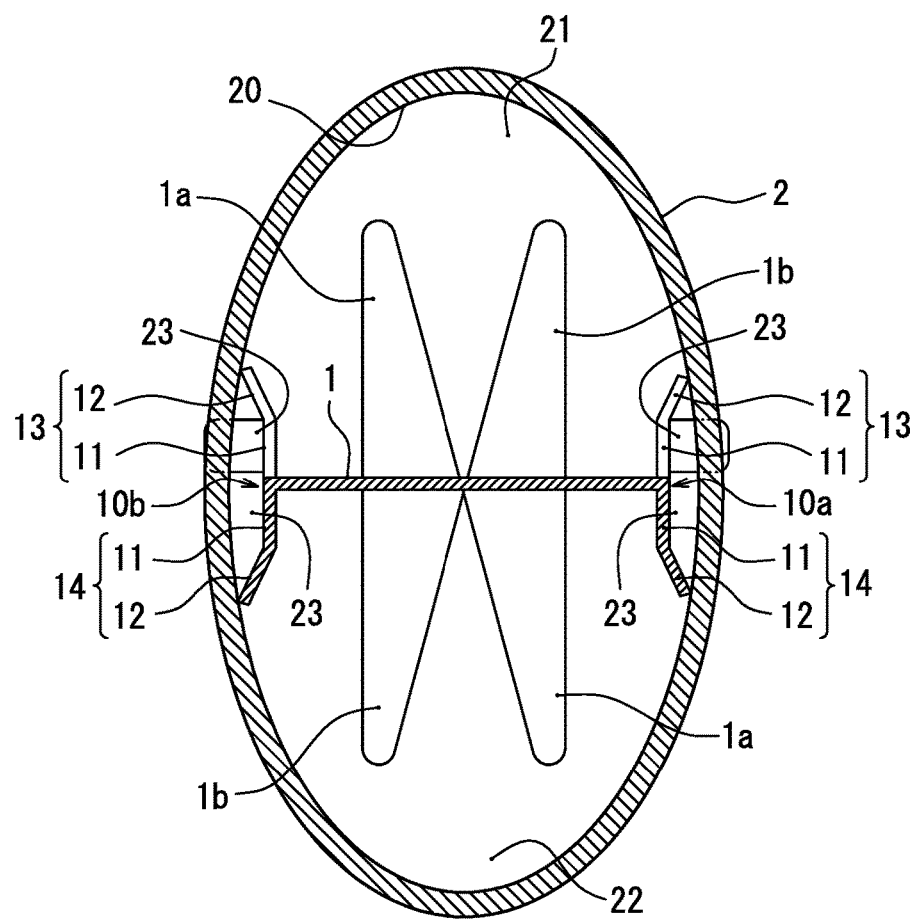
FIG. 2 is a cross-sectional view along X-X in FIG. 1.

FIG. 1 is a perspective view showing a state where a turbulence member according to a first embodiment of the present invention is inserted into a heat-transfer tube 2, and FIG. 2 is a cross-sectional view along X-X in FIG. 1.

The turbulence member of the first embodiment is mounted inside the heat-transfer tube 2 having a longitudinal elliptical cross-sectional shape as shown in FIGS. 1, 2, and is configured by a long flat plate member 1 having a width allowing the turbulence member to be set along a center line of a long diameter of the ellipse configuring the heat-transfer tube 2, and having a length substantially matching a length of the heat-transfer tube 2. The flat plate member 1 can be made of a stainless steel.

Cut-and-raising-and-bending work is applied to the flat plate member 1 at a large number of positions along a longitudinal direction, by which a large number of through holes 1c each made by a cut-and-raised hole and a large number of projected pieces 1a, 1b each made of a cut-and-raised piece are formed. The projected pieces 1a, 1b are projected in both front and back surfaces of the flat plate member 1.

As a material of the heat-transfer tube 2, a stainless steel, copper, or the like can be employed.

In one of the through holes 1c formed into a substantially rectangle, the projected pieces 1a, 1b are formed by being cut out in parallel to each other from an upstream side edge and a downstream side edge opposed inside the through hole 1c, respectively. A pair of projected pieces 1a, 1b provided in the one through hole 1c is formed in a state where base end portions thereof are bent in the same direction with respect to the flat plate member 1, and forefront portions thereof are inclined in a direction crossing each other.

Projection directions of pairs of projected pieces 1a, 1b are vertically opposite between the adjacent through holes 1c. Accordingly, the turbulent member has an aspect in which the pair of projected pieces 1a, 1b projected on the front surface side and the pair of projected pieces 1a, 1b projected on the back surface side of the flat plate member 1 are formed alternately along the longitudinal direction of the flat plate member 1.

As shown in FIG. 2, in the turbulence member, the flat plate member 1 is mounted inside the heat-transfer tube 2 having the elliptical cross-sectional shape so as to be located on the center line of the long diameter, by which a flow passage inside the heat-transfer tube 2 is partitioned into an upper region 21 on the front surface side of the flat plate member 1 and a lower region 22 on the back surface side, and the projected pieces 1a, 1b are projected equally to the upper region 21 side and the lower region 22 side, respectively.

In both side edges 10a, 10b along the longitudinal direction of the flat plate member 1, a plurality of slits 15a to 15d are provided in a direction perpendicular to the side edges 10a, 10b, and a front portion and a back portion of each of the slits 15a to 15d (both sides of the flat plate member 1 in the longitudinal direction) are raised in opposite directions, by which a plurality of front and back erecting pieces 13, 14 projected alternately on the front side and on the back side of the flat plate member 1 are formed.

Specifically, referring to FIG. 1, in the one side edge 10a of the flat plate member 1, a portion between one end on the left side of the flat plate member 1 and the slit 15a is raised to the front side to form the front erecting piece 13, a portion between the slit 15a and the slit 15b is raised to the back side to form the back erecting piece 14, and a portion between the slit 15b and another end on the right side of the flat plate member 1 is raised on the front side to form the front erecting piece 13.

In the other side edge 10b, a portion between one end on the left side of the flat plate member 1 and the slit 15c is raised to the front side to form the front erecting piece 13, a portion between the slit 15c and the slit 15d is raised to the back side to form the back erecting piece 14, and a portion between the slit 15d and another end on the right side of the flat plate member 1 is raised on the front side to form the front erecting piece 13.

As shown in FIG. 2, the front erecting pieces 13 and the back erecting pieces 14 are each configured by a first erecting piece 11 erecting substantially perpendicularly to the flat plate member 1, and a second erecting piece 12 bent obliquely from a forefront of the first erecting piece 11 to a tube wall inner circumferential surface 20 side of the heat-transfer tube 2. Respective lengths of the first and second erecting pieces 11, 12 are set so that the forefront of a second erecting piece 12 comes into contact with the tube wall inner circumferential surface 20 of the heat-transfer tube 2.

When the flat plate member 1 is contained inside the heat-transfer tube 2 in a state where the forefronts of the second erecting pieces 12 are brought into contact with the tube wall inner circumferential surface 20 of the heat-transfer tube 2, the flat plate member 1 is installed at a predetermined position in a state where rotation or deviation is prevented inside the heat-transfer tube 2, and the state is held.

The front erecting pieces 13 and the back erecting pieces 14 each configured by these first and second erecting pieces 11, 12 function as rotation preventing pieces of the turbulence member.

The front erecting pieces 13 and the back erecting pieces 14 are each configured by the first erecting piece 11 projected in the direction substantially perpendicular to the flat plate member 1, and the second erecting piece 12 bent from the forefront of the first erecting piece 11 to the tube wall inner circumferential surface 20 of the heat-transfer tube 2. The configuration is such that the second erecting piece 12 obliquely intervenes between the first erecting piece 11 and the tube wall inner circumferential surface 20. Accordingly, a relatively wide space 23 open downward is formed between each of the front erecting pieces 13 and the tube wall inner circumferential surface 20. The relatively wide space 23 open upward is formed between each of the back erecting pieces 14 and the tube wall inner circumferential surface 20.

An extent of the space 23 is set to an enough size for the fluid to circulate. This allows the fluid flowing inside the heat-transfer tube 2 to smoothly flow inside the spaces 23 in addition to the upper region 21 and the lower region 22, which prevents the flow passage resistance from becoming large. Moreover, since a foreign substance such as dust and the like flowing into the spaces 23 is pushed out by the fluid flowing in the spaces 23, it does not deposit inside the spaces 23. Thus, there is no inconvenience that the fluid is stagnated inside the spaces 23, and that the front erecting pieces 13, the back erecting pieces 14, and the heat-transfer tube 2 configuring the spaces 23 corrode.

The front erecting pieces 13 and the back erecting pieces 14 as the rotation preventing pieces are formed so as to be projected alternately on the front and back sides of the flat plate member 1 along the flow passage direction in both side edges 10a, 10b of the flat plate member 1. Accordingly, in this turbulence member, the forefronts of the second erecting pieces 12 come into contact with both the tube wall inner circumferential surface 20 on the upper region 21 side and the tube wall inner circumferential surface 20 on the lower region 22 side inside the heat-transfer tube 2, centering on the flat plate member 1, which can surely prevent rotation and deviation of the flat plate member 1 inside the heat-transfer tube 2.

Moreover, the space 23 between one of the front erecting pieces 13 or the back erecting pieces 14 and the tube wall inner circumferential surface 20 of the heat-transfer tube 2 is formed in a state separated short along the flow passage direction of the heat-transfer tube 2. Accordingly, the fluid can easily pass through the one space 23, so that inconvenience that the space 23 becomes flow passage resistance or a foreign substance deposits inside the space 23 can be further prevented.

In order to secure the enough size of the space 23 for the fluid to flow, a gap between the tube wall inner circumferential surface 20 and the first erecting piece 11 is set to 1 mm or more.

Furthermore, the slits 15a, 15b formed in the one side edge 10a of the flat plate member 1, and the slits 15c, 15d formed in the other side edge 10b are formed not at positions opposed to one another with the flat plate member 1 interposed, but at positions deviated from one another in the flow passage direction. Thereby, even if a force in the torsional direction is applied to the flat plat member 1, there is no inconvenience that the flat plate member 1 is deformed or broken, so that strength of the flat plate member 1 is increased.

Figure 3:
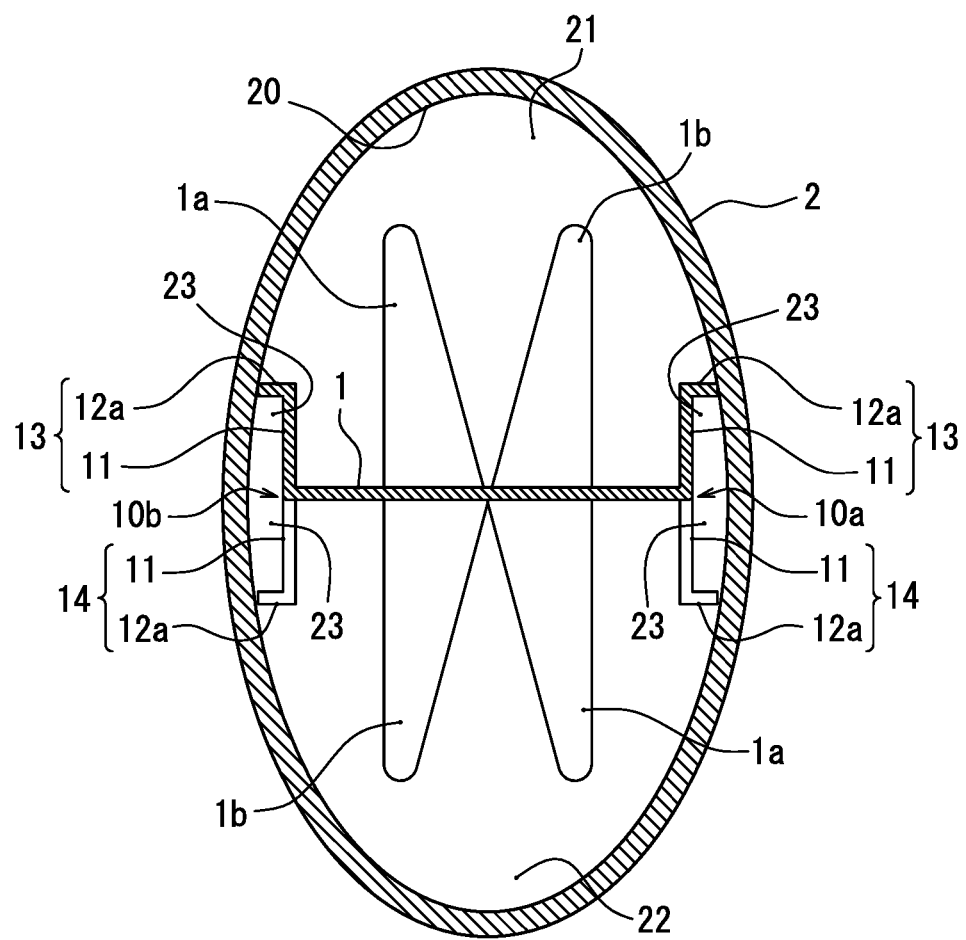
FIG. 3 is a cross-sectional view showing a state where a turbulence member according to a second embodiment of the present invention is mounted inside a heat-transfer tube.

FIG. 3 is an explanatory view of a turbulence member according to a second embodiment.

As in the first embodiment, in the turbulence member according to the second embodiment, in both side edges 10a, 10b of a flat plate member 1 are formed first erecting pieces 11 erected substantially perpendicularly to the flat plate member 1 and second erecting pieces 12a bent perpendicularly to the first erecting pieces 11 from forefronts of the first erecting pieces 11. In this second embodiment, each of the first erecting pieces 11 can be located at a distance of a length of each of the second erecting pieces 12a from a tube wall inner circumferential surface 20 of a heat-transfer tube 2, and a substantially rectangular space 23 open downward is formed between each front erecting piece 13 and the tube wall inner circumferential surface 20, and a substantially rectangular space 23 open upward is formed between each back erecting piece 14 and the tube wall inner circumferential surface 20.

Figure 4:
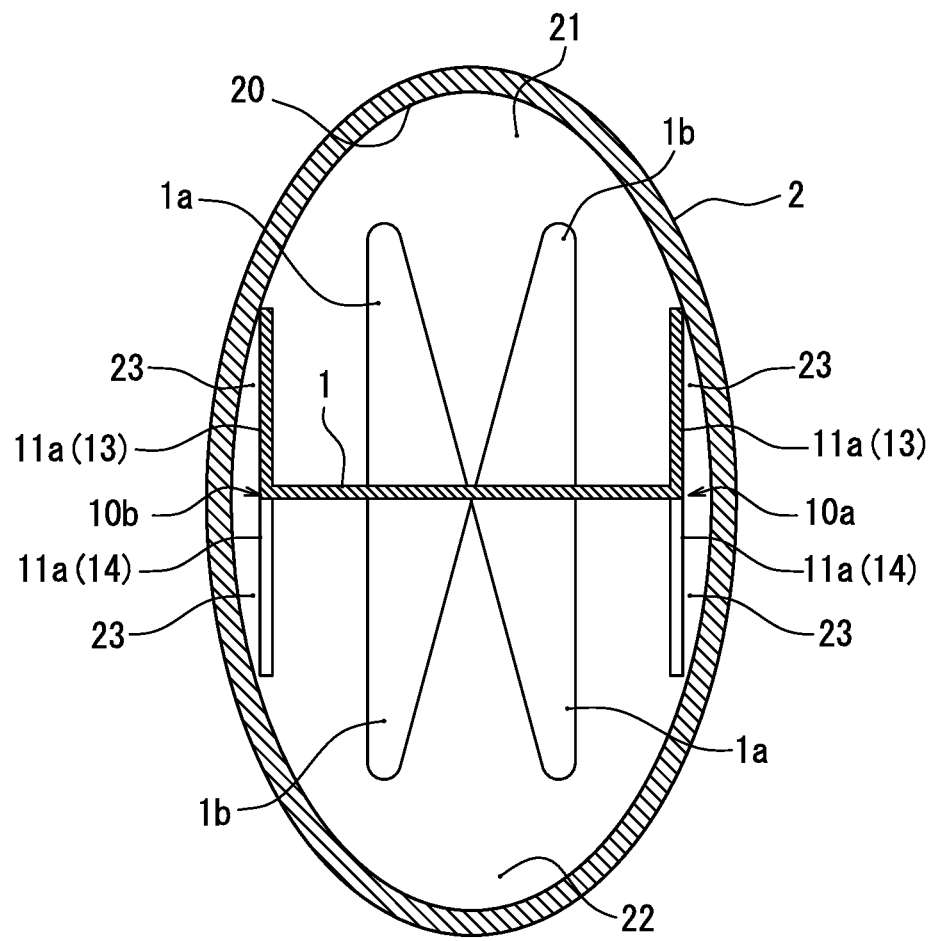
FIG. 4 is a cross-sectional view showing a state where a turbulence member according to a third embodiment of the present invention is mounted inside a heat-transfer tube.

FIG. 4 is an explanatory view of a turbulence member according to a third embodiment.

In a turbulence member according to the third embodiment, front erecting pieces 13 and back erecting pieces 14 are each configured by only an erecting piece 11a obtained by cutting and raising perpendicularly to a flat plate member 1. A forefront of the erecting piece 11a is extended till it abuts on a predetermined position of a tube wall inner circumferential surface 20 of a heat-transfer tube 2, by which a long and thin space 23 is formed between the erecting piece 11a and the tube wall inner circumferential surface 20 of the heat-transfer tube 2. In this third embodiment, since both side edges 10a, 10b of the flat plate member 1 only need to be bent to the front side and to the back side, manufacturing is simple.

Figure 5:
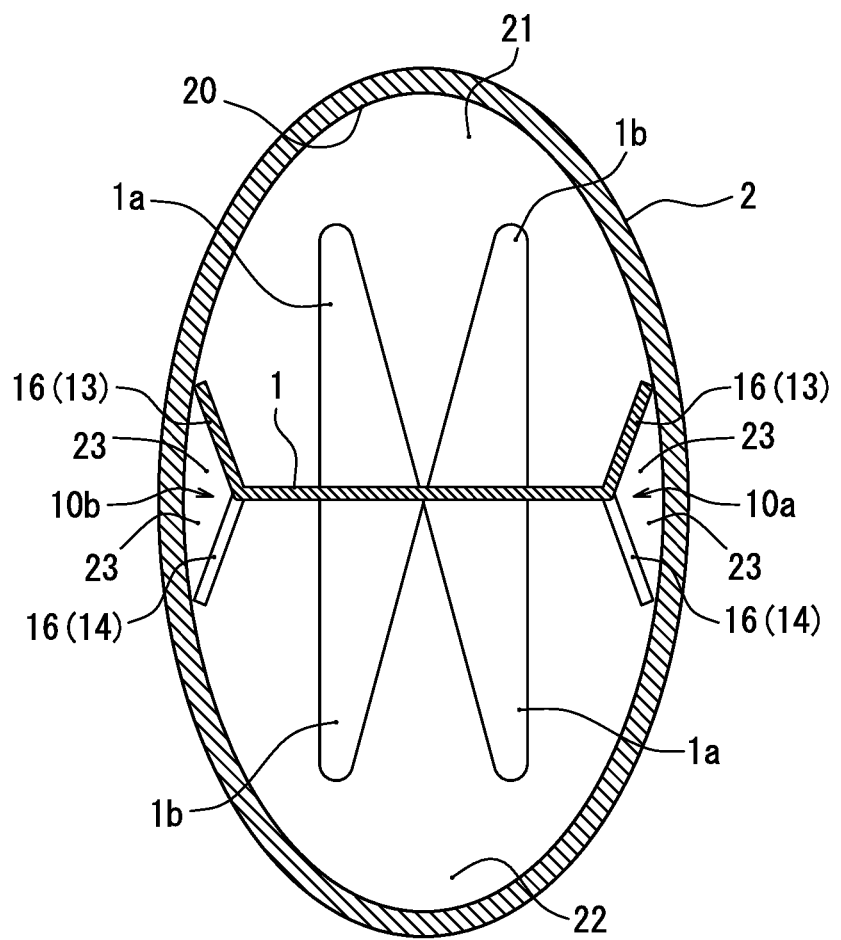
FIG. 5 is a cross-sectional view showing a state where a turbulence member according to a fourth embodiment of the present invention is mounted inside a heat-transfer tube.

FIG. 5 is an explanatory view of a turbulence member according to a fourth embodiment.

In a turbulence member according to the fourth embodiment, as front erecting pieces 13 and back erecting pieces 14, inclined pieces 16 inclined from both side edges 10a, 10b of a flat plate member 1 to a tube wall inner circumferential surface 20 of a heat-transfer tube 2 are formed. In this fourth embodiment, a substantially triangular space 23 open downward is formed between each of the front erecting pieces 13 and the tube wall inner circumferential surface 20 of the heat-transfer tube 2, and a substantially triangular space 23 open upward is formed between each of the back erecting pieces 14 and the tube wall inner circumferential surface 20 of the heat-transfer tube 2.

The scope of the present invention is not limited to the above-described embodiments, but is interpreted from the claims.

The shape of each of the front erecting pieces 13 and the back erecting pieces 14 is not limited, as long as a space having an enough size for the fluid to circulate between the tube wall inner circumferential surface 20 of the heat-transfer tube 2 and the relevant erecting piece can be secured.

Moreover, while in the above-described embodiments, as the rotation preventing means, the front erecting pieces 13 and the back erecting pieces 14 are provided in both the side edges 10a, 10b along the longitudinal direction of the flat plate member 1, a configuration may be employed, in which they may be provided in only any one of the side edges of the flat plate member 1.

Figure 6:
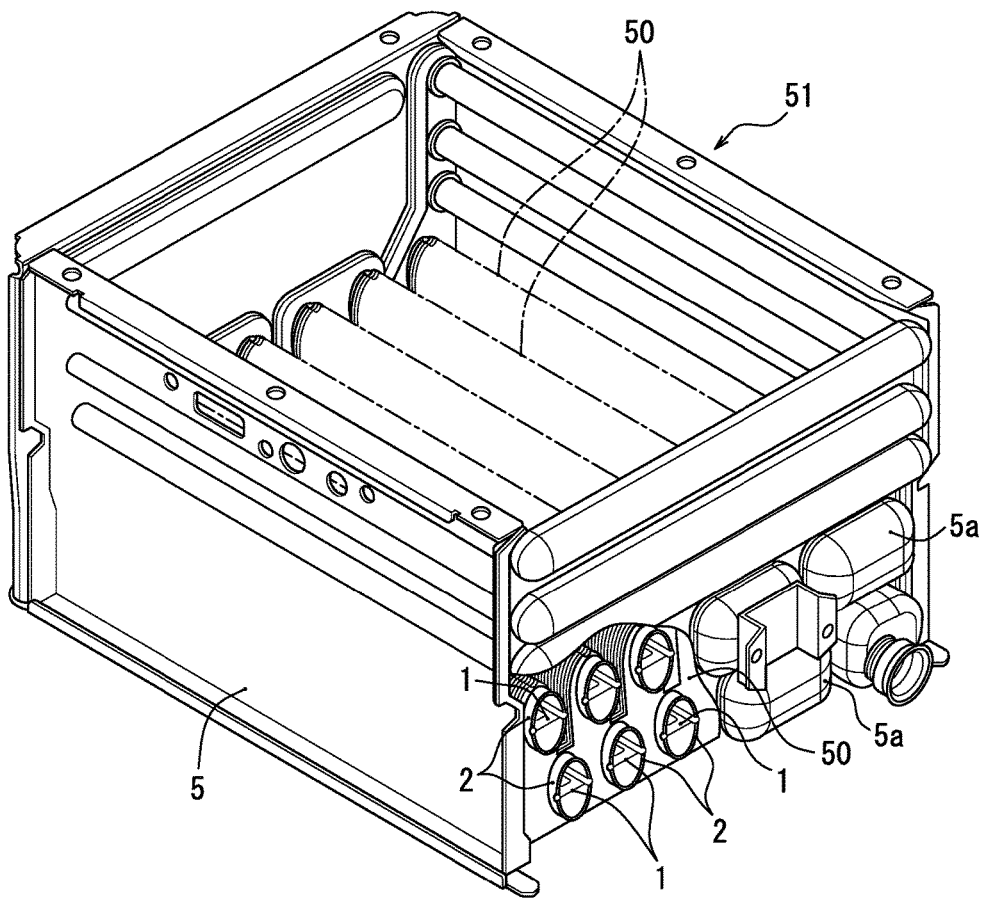
FIG. 6 is a partially cutout perspective view of a heat exchanger including the turbulence member according to the embodiments of the present invention.

The turbulence member described in each of the above-described embodiments is inserted into the heat-transfer tube 2 configuring a heat exchanger as shown in FIG. 6 to be used.

In the heat exchanger shown in FIG. 6, inside a case body 5, a large number of plate-like fins 50 for heat absorption, which fins are each made of a copper plate or a stainless steel plate, are disposed in parallel, and the heat-transfer tubes 2 made of a plurality of straight tubes each having an elliptical cross-sectional shape are provided so as to penetrate the plate-like fins 50. The heat-transfer tubes 2 are each bridged between both side walls of the case body 5 so that a short diameter of the ellipse is located horizontally. Both ends of the heat-transfer tubes 2 penetrate side walls of the case body 5, and cover portions 5a are each fixed to the side wall of the case body 5 so as to surround end edges of the two heat-transfer tubes 2. This allows the fluid conducted into the heat-transfer tubes 2 to flow while meandering through the cover portions 5a.

The flat plate member 1 of the turbulence member is inserted into each of the heat-transfer tubes 2 so as to be located horizontally along the longitudinal direction.

Figure 7:
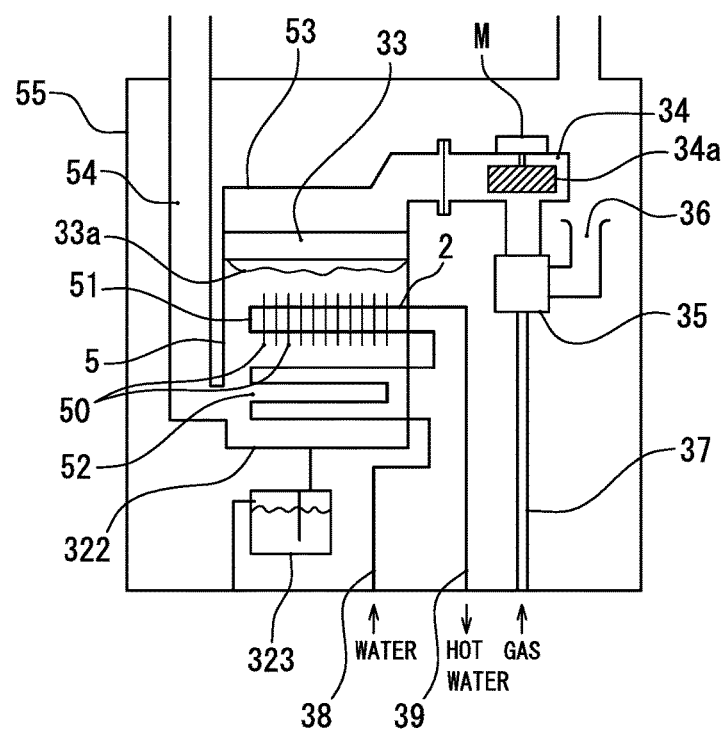
FIG. 7 is a schematic view of a water heater including the heat exchanger shown in FIG. 6.
Figure 8:
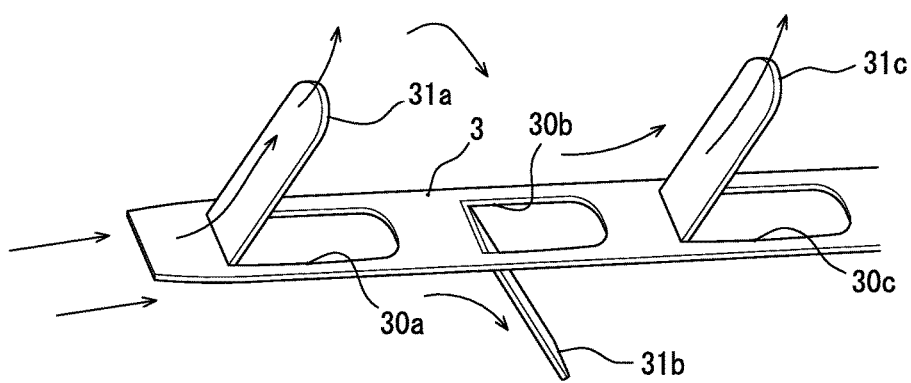
FIG. 8 is an enlarged perspective view showing a part of a conventional turbulence member.
Figure 9:
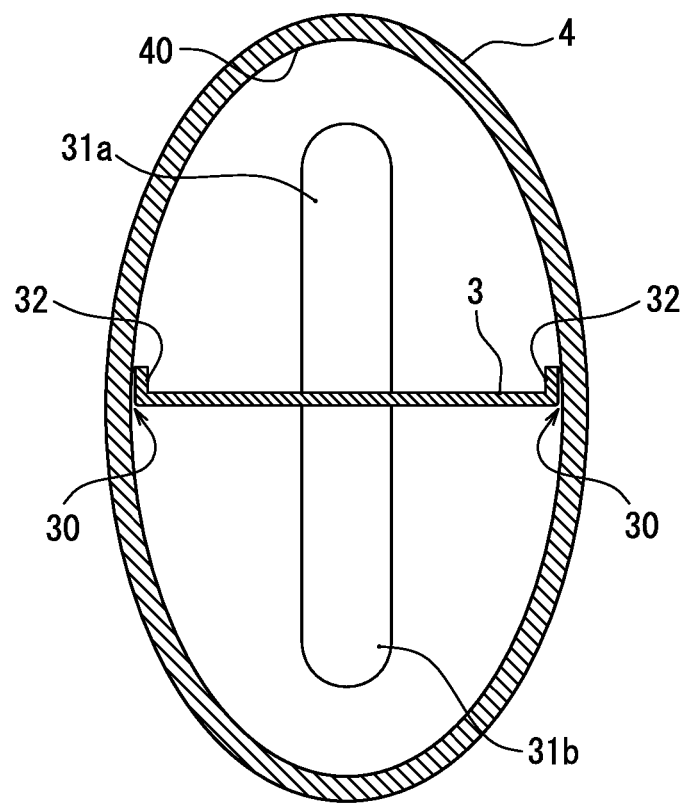
FIG. 9 is a cross-sectional view showing a state where the conventional turbulence member is mounted inside a heat-transfer tube.

The heat exchanger is used as a sensible heat exchanger of a latent heat recovery type gas water heater shown in a schematic view of FIG. 7.

In this water heater, in an upper region inside a casing 55, an instrument body 53 including a burner 33 with a downward burning surface 33a, and a fan case 34 communicating with the instrument body 53 and containing a fan 34a configured to send an air-fuel mixture of air and a combustion gas to the burner 33 inside the instrument body 53. First and second heat exchangers 51, 52 for water heating, which are heated with the combustion gas from the burner 33, are installed under the burner 33 inside the instrument body 53. On an upstream side of the fan case 34, a mixing device 35 configured to mix the air and the combustion gas is continuously provided. With the mixing device 35 is communicated an air supply passage 36 through which the air is sent, and a gas supply passage 37 through which the combustion gas is flowing.

The burner 33 is a totally aerated combustion burner, in which all air sent from the air supply passage 36 to the mixing device 35 as primary air is mixed with the combustion gas to be burned. An amount of air and an amount of combustion gas in the air-fuel mixture generated inside the mixing device 35 are decided by a rotation speed of a motor M configured to rotate the fan 34a.

The first heat exchanger 51 is a sensible heat recovery type heat exchanger installed in a central portion of the instrument 53, and the case body 5 configures a part of the instrument body 53. Moreover, the second heat exchanger 52 is a latent heat recovery type heat exchanger continued to a lower portion of the first heat exchanger 51.

This water heater is configured such that water from a water supply pipe 38 continued to an upstream side of the second heat exchanger 52 is heated by latent heat of combustion exhaust from the burner 33 in the second heat exchanger 52, and is then heated by sensible heat of the combustion exhaust in the first heat exchanger 51, and hot water heated to a preset temperature is delivered from a hot water delivery pipe 39 continued to a downstream side of the first heat exchanger 51.

The combustion exhaust passing through the second heat exchanger 52 is discharged outside the casing 55 through an exhaust duct 54, and a drain generated in the second heat exchanger 52 is collected in a drain receiver 322 to be processed in a neutralizer 323, and is then discharged outside.

From the foregoing, since the turbulence member is inserted into each of the heat-transfer tubes 2 as water conduction pipes of the first heat exchanger 51, the heated water sent from the second heat exchanger 52 hits the large number of projected pieces 1a, 1b projected on the front side and on the back side of the flat plate member 1 when passing through the heat-transfer tubes 2 of the first heat exchanger 51, which changes the flow and promotes the turbulence. This makes stable heat exchanger effectiveness inside the heat-transfer tubes 2.

Moreover, inside each of the heat-transfer tubes 2, the rotation preventing pieces (the front erecting pieces 13 and the back erecting pieces 14) are provided, lest the flat plate member 1 should unexpectedly rotate, and the space 23 through which the fluid can be circulated is provided between each of the rotation preventing pieces 13, 14 and the tube wall inner circumferential surface 20 of the heat-transfer tube 2 is formed. Accordingly, in the portions of the rotation preventing pieces 13, 14 of the flat plate member 1 inside the heat-transfer tube 2, gap corrosion due to the stagnation of the fluid is hardly caused, which can increase durability of the first heat exchanger 51 and the water heater.

The invention claimed is:

1. A turbulence member made of a flat plate member configured to be inserted into a heat-transfer tube having a substantially elliptical cross-sectional shape in a flow passage direction, and to generate turbulence in a fluid flowing inside the heat-transfer tube by a plurality of projected pieces projected on both front and back surfaces of the flat plate member, wherein
a rotation preventing piece configured to prevent rotation of the flat plate member inside the heat-transfer tube is provided in at least one of both side edges along the flow passage direction in the flat plate member,
the rotation preventing piece is provided to project from the flat plate member and have a forefront that is bent in a direction toward a tube wall inner circumferential surface of the heat-transfer tube so that the forefront comes into contact with the tube wall inner circumferential surface of the heat-transfer tube, and
a space through which the fluid can circulate is formed between the rotation preventing piece and the tube wall inner circumferential surface by bringing the forefront of the rotation preventing piece into contact with the tube wall inner circumferential surface, wherein
the rotation preventing piece comprises erecting pieces formed by bending the first side edge and the second side edge of the flat plate member, and
the erecting pieces are provided on the at least one of the first side edge and the second side edge so that a front erecting piece bent on a front side and a back erecting piece bent on a back side are located alternately along a longitudinal direction of the at least one of the first side edge and the second side edge.

2. The turbulence member according to claim 1, wherein the erecting piece has a first erecting piece erecting from the flat plate member in a substantially perpendicular direction, and a second erecting piece extending from a forefront of the first erecting piece in a direction toward the tube wall inner circumferential surface, and the erecting piece is set to have a length at which a forefront of the second erecting piece comes into contact with the tube wall inner circumferential surface.

3. The turbulence member according to claim 1, wherein
the erecting pieces are provided on both the side edges of the flat plate member along the flow passage direction, and
boundary portions between the front erecting pieces and the back erecting pieces provided in the respective side edges are formed at positions deviated from one another in the longitudinal direction of the flat plate member in the one side edge and the other side edge.

4. A heat exchanger comprising the heat-transfer tube into which the turbulence member according to claim 1 is inserted.

5. A heat exchanger comprising the heat-transfer tube into which the turbulence member according to any one of claims 1-4 is inserted.

6. A water heater comprising the heat exchanger according to claim 4.

7. A water heater comprising the heat exchanger according to claim 5.

8. The turbulence member according to claim 2, wherein
the erecting pieces are provided on both the side edges of the flat plate member along the flow passage direction, and
boundary portions between the front erecting pieces and the back erecting pieces provided in the respective side edges are formed at positions deviated from one another in the longitudinal direction of the flat plate member in the one side edge and the other side edge.

9. A heat exchanger comprising the heat-transfer tube into which the turbulence member according to claim 8 is inserted.

10. A heat exchanger comprising the heat-transfer tube into which the turbulence member according to claim 2 is inserted.

* * * * *